United States Patent
Wu

(10) Patent No.: US 8,336,693 B2
(45) Date of Patent: Dec. 25, 2012

(54) BICYCLE HUB

(76) Inventor: Chun-Yi Wu, Taichung (TW)

(*) Notice: Subject to any disclaimer, the term of this patent is extended or adjusted under 35 U.S.C. 154(b) by 401 days.

(21) Appl. No.: 12/607,016

(22) Filed: Oct. 27, 2009

(65) Prior Publication Data

US 2011/0094846 A1     Apr. 28, 2011

(51) Int. Cl.
*F16D 41/30*     (2006.01)
(52) U.S. Cl. ............................. 192/64; 192/46
(58) Field of Classification Search ........... 192/64, 192/46
See application file for complete search history.

(56) References Cited

U.S. PATENT DOCUMENTS

| | | | | |
|---|---|---|---|---|
| 1,412,336 | A | * | 4/1922 | Carter .............................. 192/64 |
| 4,324,323 | A | * | 4/1982 | Campagnolo .................... 192/64 |
| 4,400,999 | A | * | 8/1983 | Steuer ............................ 475/213 |
| 6,527,094 | B2 | * | 3/2003 | Reinhart et al. ............. 192/3.34 |
| 7,121,394 | B2 | | 10/2006 | Chen |

* cited by examiner

*Primary Examiner* — Richard M. Lorence
(74) *Attorney, Agent, or Firm* — Wang Law Firm, Inc.; Li K. Wang; Stephen Hsu

(57) ABSTRACT

A bicycle hub comprises: a housing, a driving base in the housing, and an engaging unit for the driving base to drive the housing in a single direction. The engaging unit consists of several claws and elastic elements surrounding thereon. Each of the elastic elements is an arc hook and urges against the corresponding claw. The claws thus enable the driving base to drive the housing.

2 Claims, 7 Drawing Sheets

BICYCLE HUB

BACKGROUND OF THE INVENTION

1. Field of Invention

The invention relates to a bicycle hub and, in particular, to a bicycle hub that is easy to assembled and maintained and has a very good transmission effect.

2. Related Art

A conventional hub transmission structure, as shown in FIG. 10, mainly consists of a housing 91 and a chain wheel base 93 connected inside the housing 91. The housing 91 has an inner hole 94 whose inner ring surface is formed with a ratchet ring 95. One end part of the chain wheel base 93 is accommodated in the inner hole 94 of the housing 91. The end part has a claw base 96. The claw base 96 is elastically pressed by a ring spring 97, pushing a plurality of claws 98 against the claw base 96. One end of each of the claws 98 is elastically pressed by the ring spring 97 so that its other end rises and matches with the ratchet ring 95 of the housing 97. The chain wheel base 93 is thus only allowed to drive the housing 91 in a single direction.

However, the above-mentioned hub transmission structure relies on the ring spring 97 to fix the claws 98 on the claw base 96. Therefore, once the ring spring 97 has elasticity fatigue or some deformation, as shown in FIG. 11, the forces imposed on the claws 98 become uneven. The claws 98 and the ratchet ring 95 cannot engage firmly, and the transmission efficiency is greatly reduced. The problem can be as serious as sliding. Moreover, to replace the ring spring 97 or if one of the claws 98 breaks, all the claws 98 will be released immediately after the user removes the ring spring 97. This is because they are originally positioned by the ring spring 97. So the user needs to re-assemble all the claws 98 in each replacement. This is very inconvenient for maintenance.

SUMMARY OF THE INVENTION

An objective of the invention is to provide a bicycle hub that is easy to assemble and maintain and has a very good transmission effect.

To achieve the above-mentioned objective, the invention provides a bicycle hub that includes a housing, a driving base, and an engaging unit. One end of the housing is formed with an inner hole that has a ratchet ring on its inner ring surface. One end of the driving base is mounted in the inner hole of the housing to rotate with respect to the housing. The end of the driving base in the inner hole has several annular accommodating grooves on its outer surface. The engaging unit has several claws in the corresponding accommodating grooves and an elastic element around each of the claws to urge it against the ratchet ring.

The claw has a pivotal part to be inserted in the accommodating groove and an engaging part that is opposite to the pivotal part and engages with the ratchet ring. The engaging part of the claw can swing from a first position that engages with the ratchet ring to a second position away from the ratchet ring, using the pivotal part as the axis. The claw is further formed with a groove extending along the rotational direction of the driving base, defining an acting end and a limiting end. The elastic element is an arc hook, with its one end connected to the side of the accommodating groove and its other end extending and catching the groove of the claw to press on the acting end of the claw groove, so that the engaging part of the claw rises up. The limiting end of the claw groove is stopped by the elastic element to restrict the rising angle of the engaging part. The engaging part swings to the first position and engages with the ratchet ring in one direction.

The invention further provides another bicycle hub that includes a housing, a driving base, and an engaging unit. One end of the housing has an inner hole with a plurality of annular accommodating grooves on its inner ring surface. The driving base is mounted in the inner hole of the housing its one end to rotate with respect to the housing. The outer surface of the end of the driving base in the inner hole has a ratchet ring. The engaging unit has a plurality of claws installed in the accommodating grooves and an elastic element surrounding the corresponding claw to urge the claw against the ratchet ring.

Each of the claws has a pivotal part to be put in the corresponding accommodating groove and an engaging part opposite to the pivotal part and matching with the ratchet ring. The engaging part of the claw swings from a first position matching with the ratchet ring to a second position away from the ratchet ring, using the pivotal part as an axis. The claw further has a groove extending along the rotational direction of the driving base, defining an acting end and a limiting end. The elastic element is an arc hook, with its one end connected to the side of the accommodating groove and its other end extending and catching the groove of the claw to press on the acting end of the claw groove, so that the engaging part of the claw rises up. The limiting end of the claw groove is stopped by the elastic element to restrict the rising angle of the engaging part; and the engaging part swings to the first position and engages with the ratchet ring in one direction.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

Figure 1:
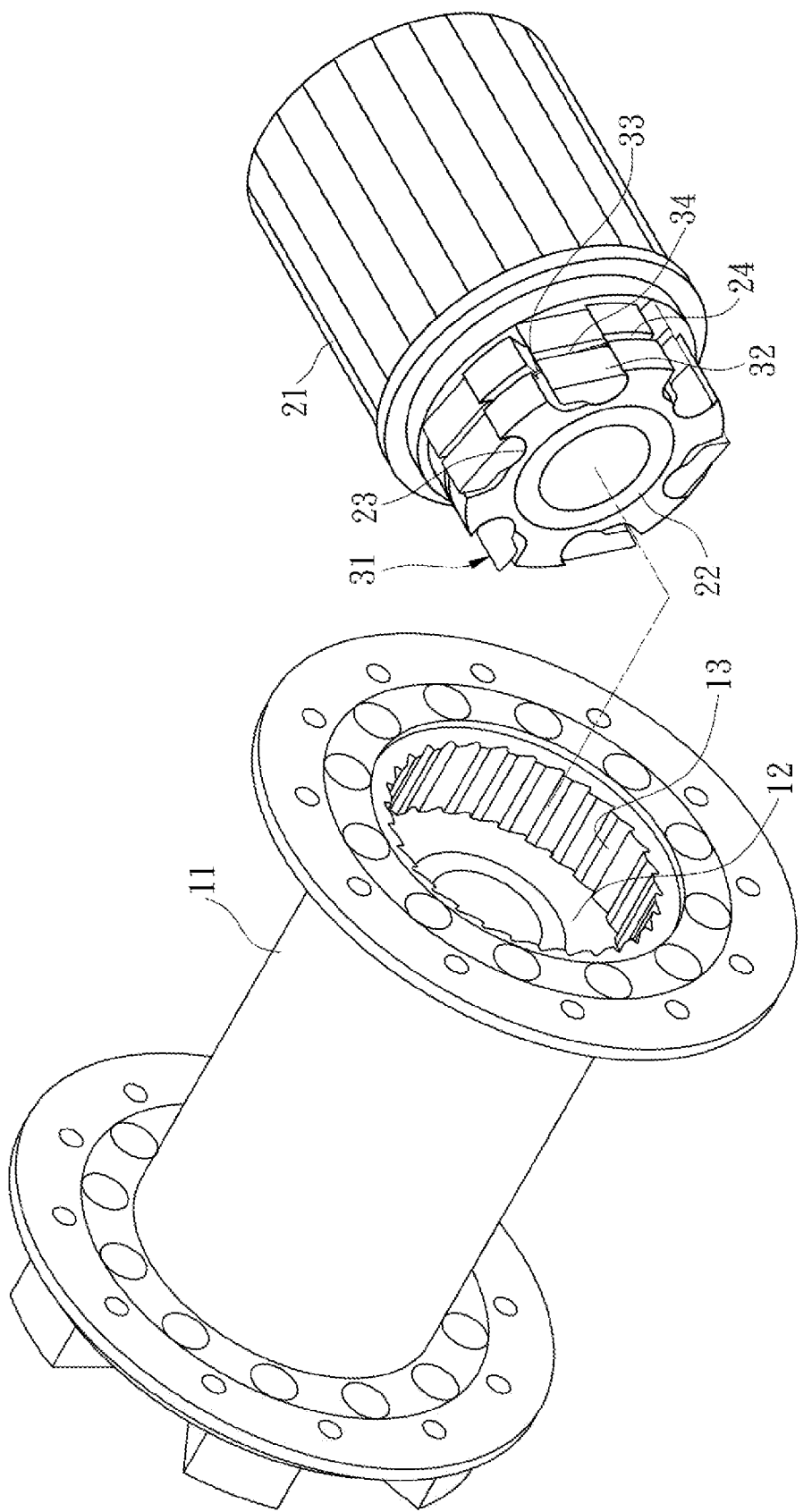
FIG. 1 is a three-dimensional view of the first embodiment of the invention.
Figure 2:
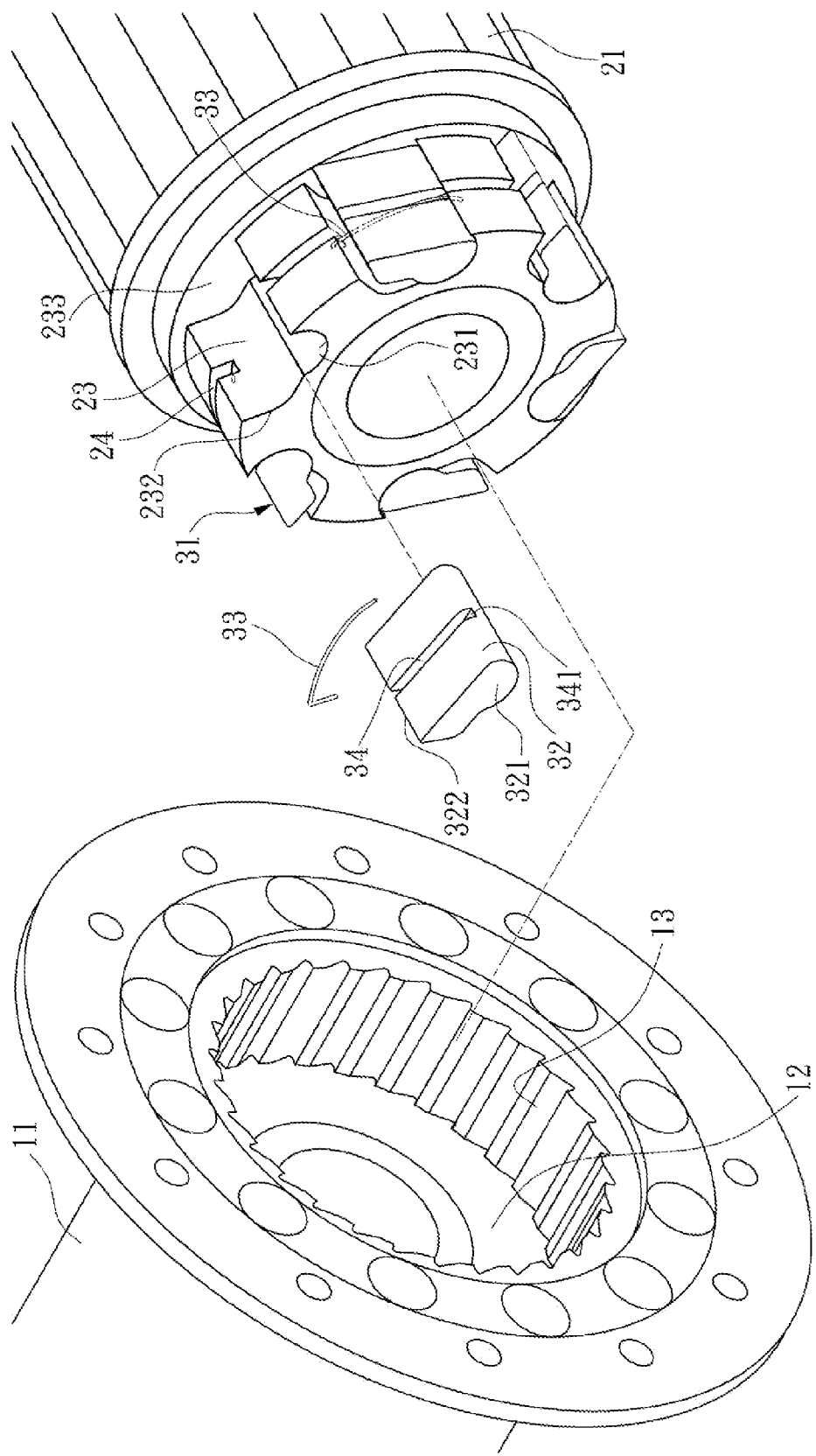
FIG. 2 is a local exploded view of the first embodiment.
Figure 3:
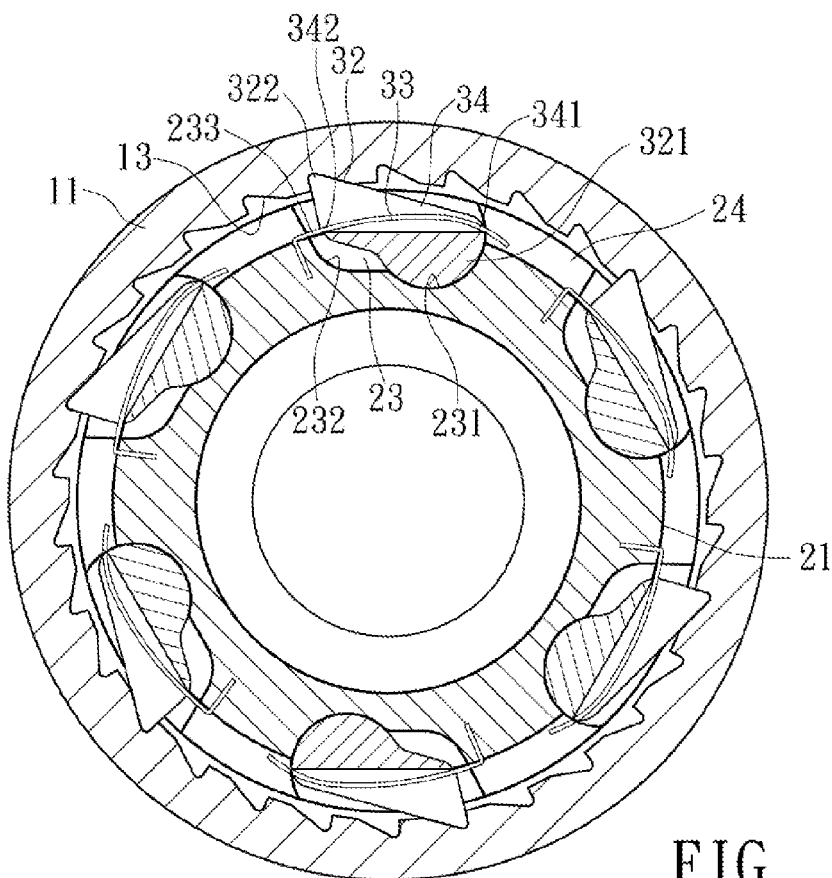
FIG. 3 is a schematic view of the first embodiment after it is assembled.

The present invention will be apparent from the following detailed description, which proceeds with reference to the accompanying drawings, wherein the same references relate to the same elements.

Please refer to FIGS. 1 to 5 for a first embodiment of the disclosed bicycle hub. It mainly consists of a housing 11, a driving base 21 disposed in the housing 11, and an engaging unit 31 for the driving base 21 to drive the housing 11 in a single direction.

One end of the housing 11 is formed with an inner hole 12. The inner ring surface of the inner hole 12 is formed with a ratchet ring 13.

One end part 22 of the driving base 21 is mounted in the inner hole 12 of the housing 11. The driving base 21 is driven by a bicycle chain (not shown) to rotate. The end 22 of the driving base 21 in the inner hole 12 has several accommodating grooves 23 along the annular direction on its outer surface. Each of the accommodating grooves 23 consists of a bottom part 231, a limiting part 232, and an opening 233. The outer surface of the end part 22 further has a notch 24 in the annular direction and cutting through the openings 233 of the accommodating grooves 23.

The engaging unit 31 is comprised of several claws 32 disposed in the corresponding accommodating grooves 23 and an elastic element 33 around each of the claws 32 to urge the corresponding claw 32 against the ratchet ring 13. Each of the claws 32 has a pivotal part 321 for the accommodating groove 23 and an engaging part 32 opposite to the pivotal part 321 and engaging with the ratchet ring 13. The engaging part 322 of the claw 32 can swing from a first position 41 engaging with the ratchet ring 13 to a second position 42 away from the ratchet ring 13, using the pivotal part 321 as an axis. The claw 32 is further formed with a groove 34 extending along the rotational direction of the driving base 21 and connecting with the notch 24 on the end part 22 of the driving base 21. The groove 34 is defined with an acting end 341 and a limiting end 342. The elastic element 33 is an arc hook. One end of the elastic element 33 connects to the notch 24 of the accommodating groove 23 near the limiting part 232. The other end extends and catches the groove 34 of the claw 32, pressing against the acting end 341 of the groove 34 of the claw 32. The engaging part 322 of the claw 32 thus rises. The limiting end 342 of the groove 34 of the claw 32 is stopped by the elastic element 33 to restrict the rising angle of the engaging part 322 of the claw 32. The engaging part 322 of the claw 32 can thus swing to the first position 41, maintaining a single-direction engagement with the ratchet ring 13 all the time.

Figure 4:
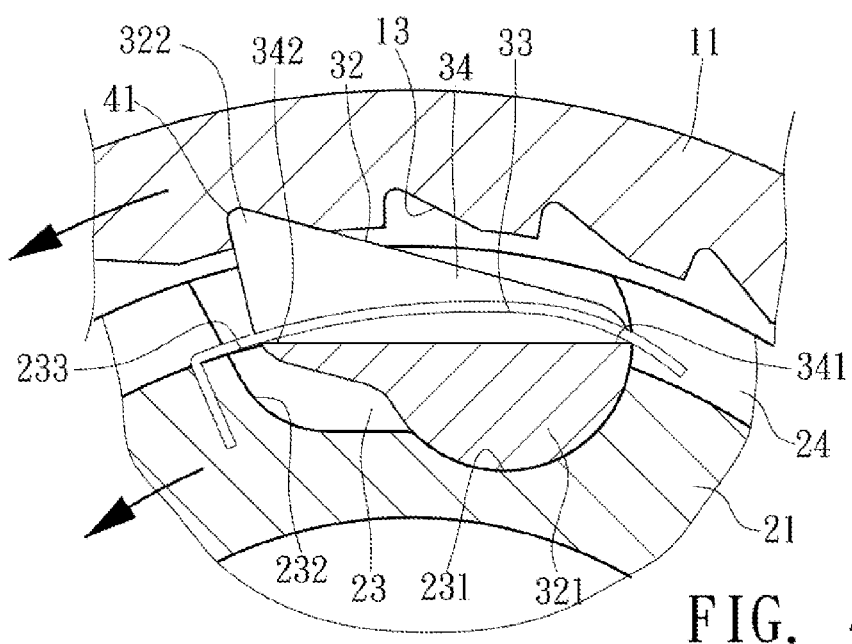
FIG. 4 is a schematic view of the first embodiment in use, showing the state when the driving base drives the housing.

Please refer to FIG. 4. After the disclosed bicycle hub is assembled, the pivotal part 321 of each of the claws 32 is exactly disposed in the groove bottom part 231 of the corresponding accommodating part 23. Each of the elastic elements 33 catches the groove 34 of the claw 32, imposing a pressure on the acting end 341 thereof. The engaging part 322 of each of the claws 32 thus swings upward to the first position 41. In this case, the engaging parts 322 of the claws 32 penetrate out of the openings 233 of the accommodating grooves 23, correspondingly engaging the ratchet ring 13 of the housing 11. Since the limiting end 342 of the groove 34 of each of the claws 32 also rises and touches against the elastic element 33, the rising angle of the engaging parts 322 of the claws 32 is restricted. When the driving base 21 is driven to rotate counterclockwise, the single-direction engagement between the claws 32 and the ratchet ring 13 drives the housing 11 to rotate along.

Figure 5:
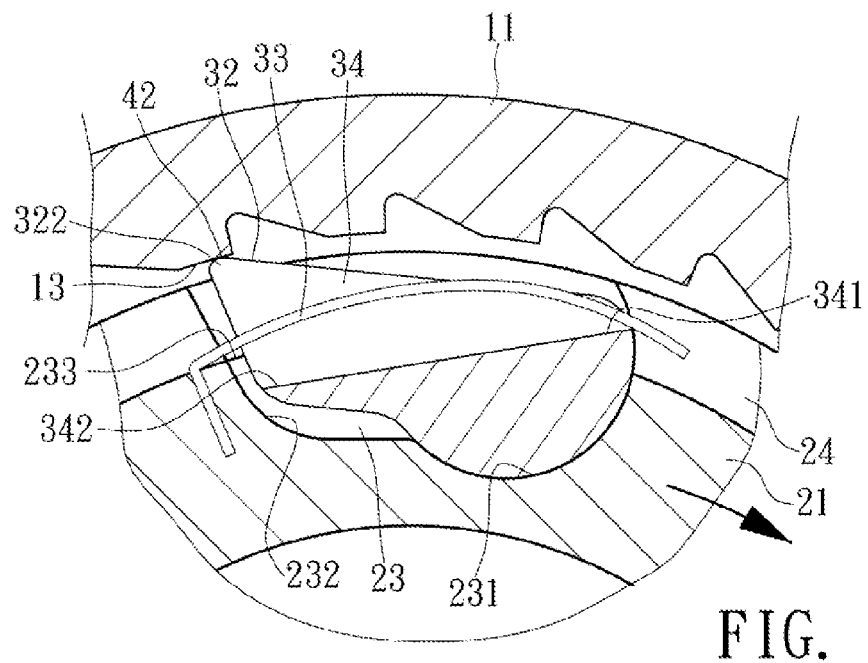
FIG. 5 is a schematic view of the first embodiment in use, showing the state when the driving base rotate in reverse alone.

On the other hand, when the driving base 21 is driven to rotate clockwise, as shown in FIG. 5, the engaging part 322 of the claw 32 on the driving base 21 is urged by the ratchet ring 13 to push the acting end 341 of the claw 32 upward to urge against the elastic element 33. The engaging part 322 of the claw 32 thus swings from the first position 41 to the second position 42 away from the ratchet ring 13. Afterwards, the resilient restoring force of the elastic element 33 brings the claws 32 to engage with the ratchet ring 13 again. This mechanism allows the driving base 21 to rotate in reverse alone without rotating the housing 11. Therefore, the invention can achieve the expected transmission effect.

Figure 6:
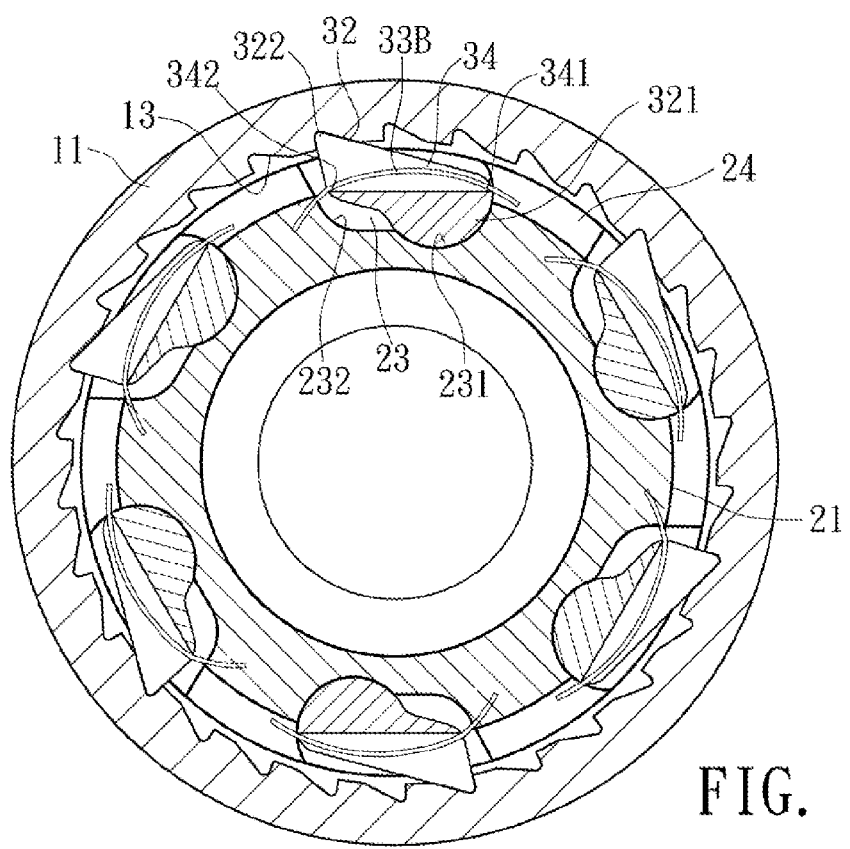
FIG. 6 is a schematic view of the second embodiment of the invention.

Please refer to FIG. 6 for a second embodiment of the disclosed bicycle hub. It differs from the first embodiment in that the elastic element 33B is connected to the sidewall of the accommodating groove 23 using its one end. Its other end extends and catches the groove 34 of the claw 32, pressing against the acting end 341 thereof. The engaging part 322 of the claw 32 can also swing to the first position 41 to maintain the single-direction engagement with the ratchet ring 13. When the acting end 341 of the groove 34 of the claw 32 is urged by the elastic element 33B, its limiting end 342 also rises, also restricted by the elastic element 33B. As a result, the rising angle of the engaging parts 322 of the claws 32 is fixed as before.

Figure 7:
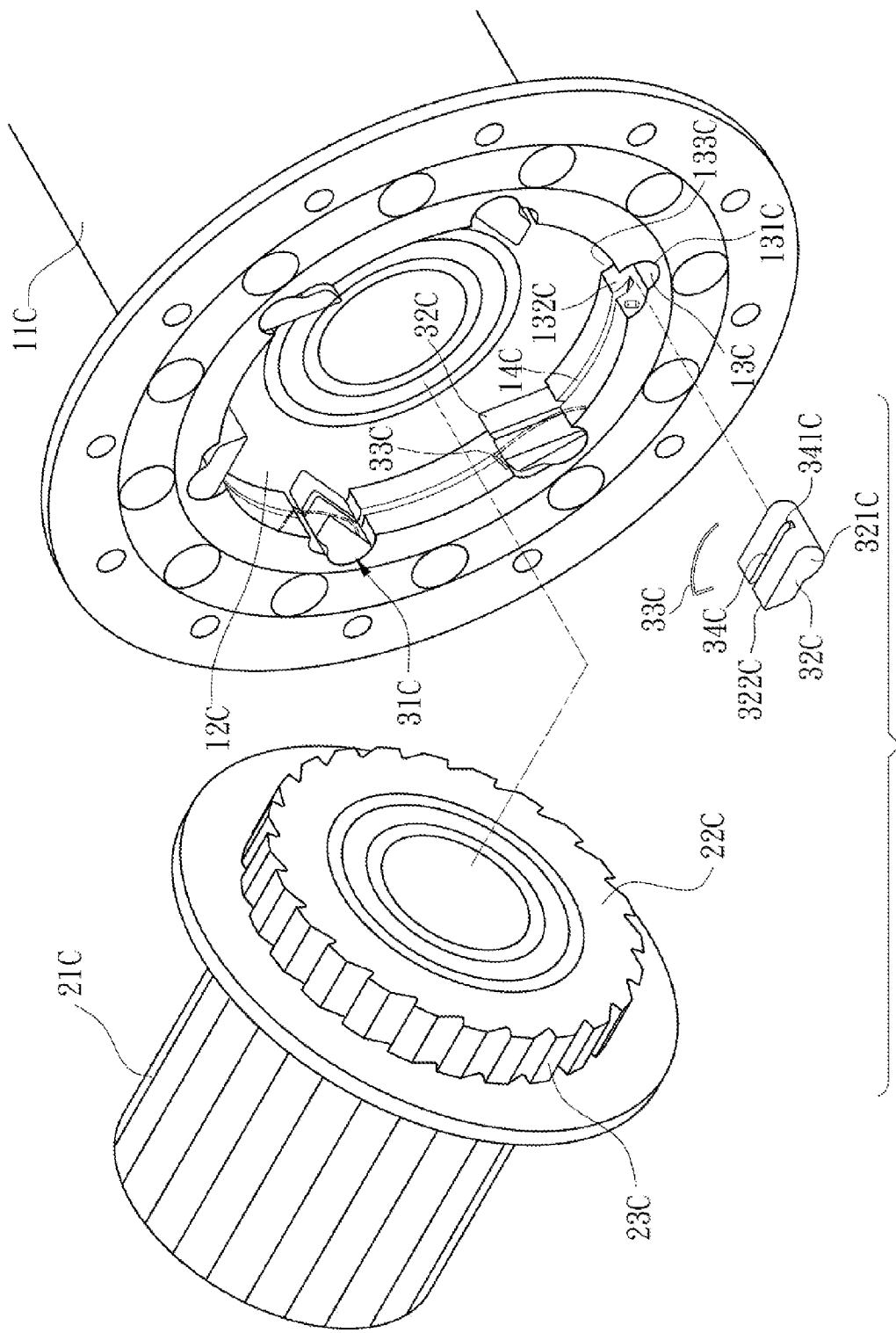
FIG. 7 is a three-dimensional exploded view of the third embodiment of the invention.
Figure 8:
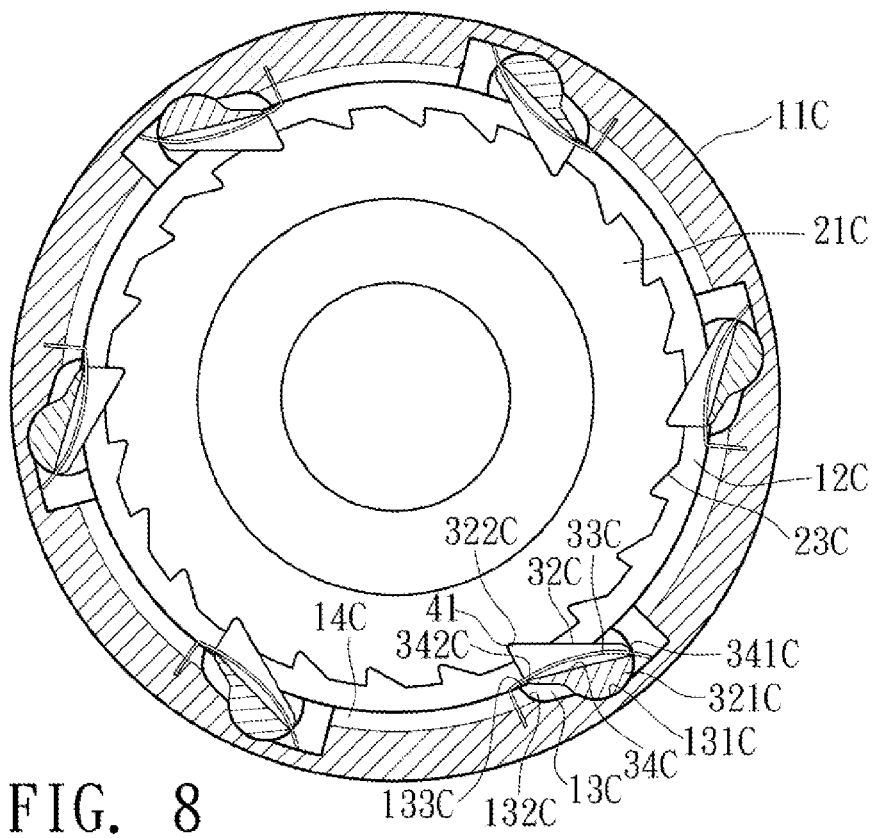
FIG. 8 is a schematic view of the third embodiment after it is assembled.
Figure 9:
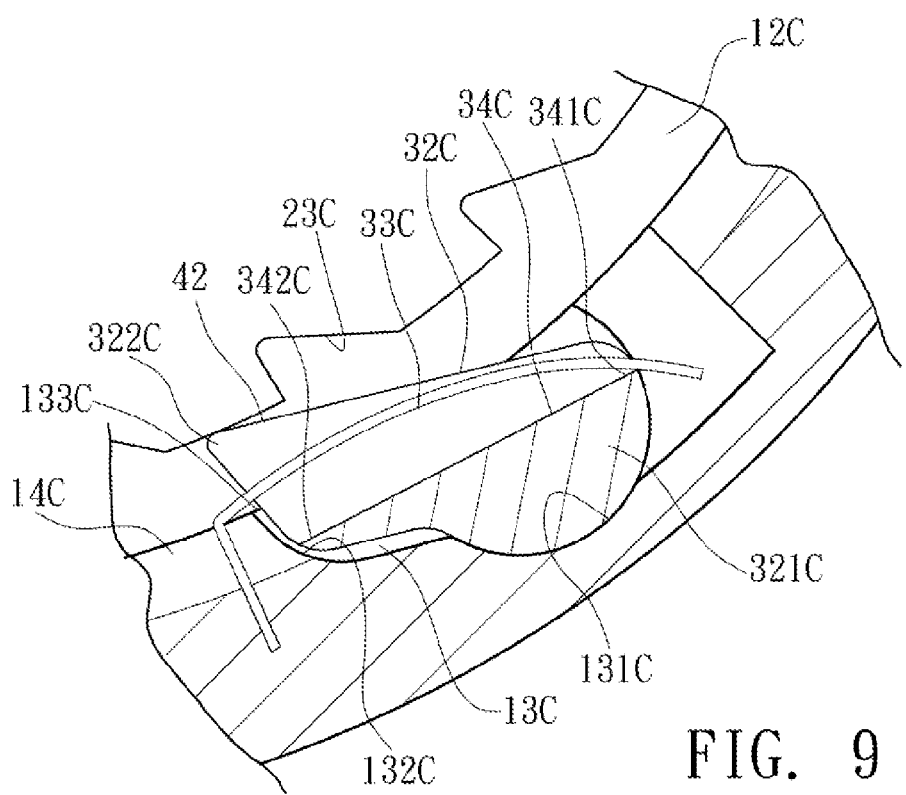
FIG. 9 is a schematic view of the third embodiment in use, showing the state when the engaging part of the claw swings to the second position.
Figure 10:
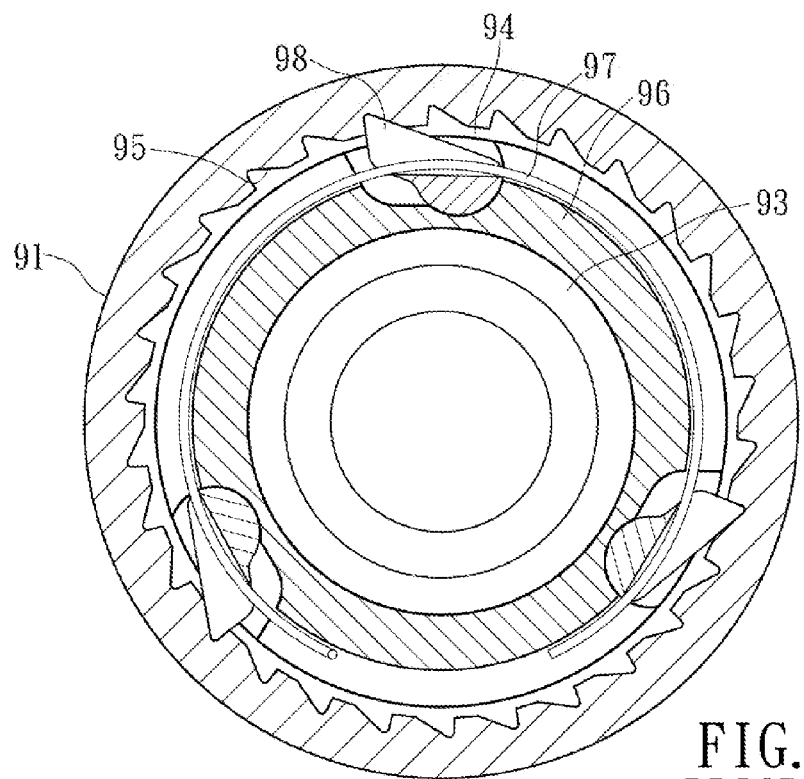
FIG. 10 is a schematic view of a conventional hub transmission structure.
Figure 11:
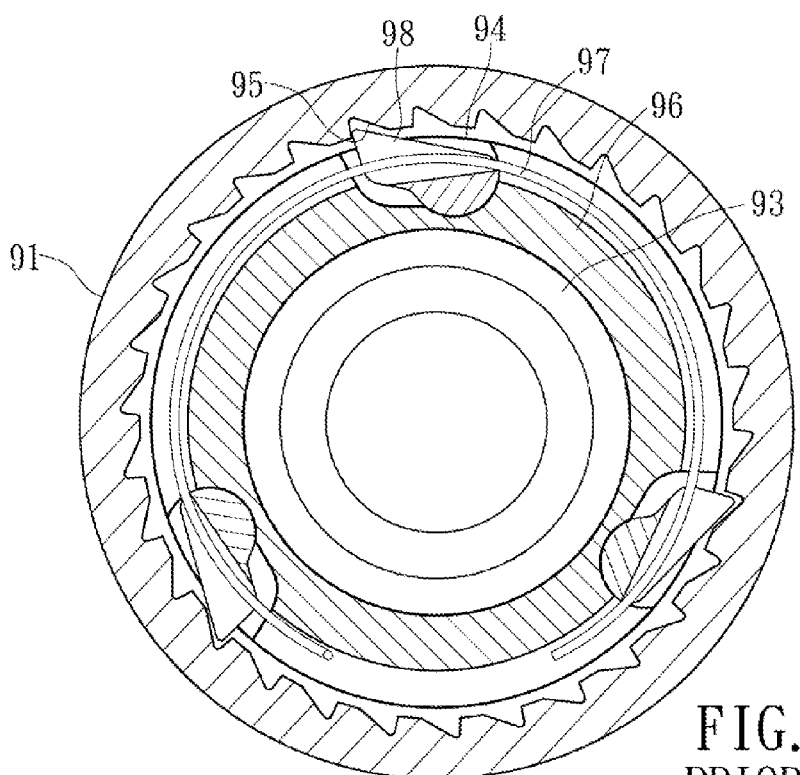
FIG. 11 is a schematic view of the conventional hub transmission structure when its ring spring is broken.

FIGS. 7 to 9 show a third embodiment of the disclosed bicycle hub. It mainly includes a housing 11C, a driving base 21C disposed in the housing 11C, and an engaging unit 31C for the driving base 21C to drive the housing 11C in a single direction.

One end of the housing 11C is formed with an inner hole 12C. The inner ring surface of the inner hole 12C has several annular accommodating grooves 13C, each of which consists of a groove bottom part 131C, a limiting part 132C, and an opening 1330. The inner ring surface of the inner hole 12C is further formed with a notch 14C along the annular direction and cutting through the openings 133C of the accommodating grooves 13C.

One end part 22C of the driving base 21C is mounted in the inner hole 12C. The driving base 21C is driven by a bicycle chain (not shown) to rotate with respect to the housing 11C. The end part 22C of the driving base 21C in the inner hole 12C has a ratchet ring 23C on its outer surface.

The engaging unit 31C has several claws 32C to be disposed in the corresponding accommodating grooves 13C and an elastic element 33C for each of the claws 32C to urge against the ratchet ring 23C. The claw 32C has a pivotal part 321C for the accommodating groove 13C and an engaging part 322C opposite to the pivotal part 321C and engaging with the ratchet ring 23C. The engaging part 322C of the claw 32C can swing from a first position 41 engaging with the ratchet ring 23C to a second position 42 away from the ratchet ring 23C, using the pivotal part 321C as the axis. The claw 32C is further formed with a groove extending along the rotational direction of the driving base 21C. The groove 34C is defined with an acting end 341C and a limiting end 342C. The elastic element 33C is an arc hook, with its one end connected to the notch 14C of the accommodating groove 13C near the limiting part 132C and its other end extending and catching the groove 34C of the claw 32C, pressing upon the acting 3nd 341C of the groove 34C of the claw 32C. The engaging part 322C of the claw 32C thus rises. The limiting end 342C of the groove 34C of the claw 32C is stopped by the elastic element 33C to constrain the rising angle of the engaging part 322C of the claw 32C. The engaging part 322C of the claw 32C thus swings to the first position 41 and maintains its single-direction engagement with the ratchet ring 23C.

In practice, as the third embodiment of the disclosed bicycle hub runs, each of the elastic elements 33C catches the groove 34C of the corresponding claw 33C and generates a pressing force on the acting end 341C of the groove 34C. The engaging part 322C of each claw 32C swings upward to the first position 41. In this case, the engaging parts 322C of the claws 32C penetrate through the openings 133C of the accommodating grooves 13C, and correspondingly engage with the ratchet ring 23C of the driving base 21C. The limiting ends 342C of the grooves 34C of the claws 32C also rise to touch against the elastic elements 33C. This constrains the rising angle of the engaging parts 322C of the claws 32C to a fixed value. When the driving base 21C is driven by a force, the single-direction engagement between the claws 32C and the ratchet ring 23C drives the housing 11C to rotate along. This achieves the expected transmission effect.

The disclosed bicycle hub has the following advantages:

1. Each of the claws in the invention has an elastic element. Even if one of the elastic elements or claws is broken, the rest claws can still engage with the ratchet ring normally. The invention thus does not slide.

2. The acting end and the limiting end in the groove of the claw are defined such that when the elastic element presses on the acting end, the limiting end of the claw groove is stopped by the elastic element to restrict the rising angle of the claw. Therefore, it is not necessary to provide additional stopping blocks in the accommodating grooves. The disclosed claws can still maintain a fixed rising angle. This greatly simplifies the structure of the hub and reduces its production cost. Moreover, the rising angle of the claws is fixed, making the assembly of the disclosed hub much easier.

3. Each of the claws has a corresponding elastic element. Therefore, one can simply replace any damaged elastic element or claw. This makes the maintenance quicker and easier.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A bicycle hub, comprising:
a housing having one end formed with an inner hole with an inner ring surface and the inner hole having a ratchet ring formed on the inner ring surface;
a driving base, with a first end and a second end, mounted in the inner hole of the housing, having the first end to rotate relative to the housing, an outer surface of the first end having a plurality of annular accommodating grooves, wherein the outer surface of the first end of the driving base has a notch that is annularly formed and cuts through each of the accommodating grooves; and
an engaging unit, having a plurality of claws installed in the accommodating grooves and a plurality of elastic elements, each elastic element engages a respective claw and urges the claw against the ratchet ring;
wherein
each claw has a pivotal part and an engaging part, the pivotal part being placed in a corresponding accommodating groove and the engaging part being opposite to the pivotal part for engaging the ratchet ring,
the engaging part of each claw, using the pivotal parts as an axis, swings from a first position engaged with the ratchet ring to a second position away from the ratchet ring,
each claw further has a claw groove extending along a rotational direction of the driving base,
each claw groove is defined with an acting end and a limiting end,
each elastic element having a first end and a second end, each elastic element being placed in the claw groove of one claw with only the first end of each elastic element being attached into the driving base and the second end pressing against the acting end of the claw groove, so that the engaging part of each claw rises out of the accommodating groove,
the limiting end of each claw groove is restricted by the elastic element from rising out of a corresponding accommodating groove, and
the engaging part of each claw swings to the first position and engages with the ratchet ring on the housing when the first end of the driving base rotates in one direction.

2. A bicycle hub, comprising:
a housing having one end with an inner hole and the inner hole having an inner ring surface, the inner hole having a plurality of annular accommodating grooves, the inner ring surface of the inner hole having a notch in an annular direction and cutting through the accommodating grooves;
a driving base, mounted in the inner hole of the housing, rotating with respect to the housing, the driving base having an outer surface with a ratchet ring; and
an engaging unit, which has a plurality of claws installed in the accommodating grooves and a plurality of elastic elements, each elastic element engaging a respective claw and urging the claw against the ratchet ring;
wherein
each claw has a pivotal part placed in a corresponding accommodating groove and an engaging part opposite to the pivotal part for engaging the ratchet ring,
the engaging part of each claw, using the pivotal part as an axis, swings from a first position engaged with the ratchet ring to a second position away from the ratchet ring,
the claw further has a claw groove extending along a rotational direction of the driving base, the claw groove being defined with an acting end and a limiting end, the claw groove on the claw connects to the notch, each elastic element is an arc hook having a first end and a second end with only the first end of each elastic element attached to the housing near the accommodating groove and the second end extending along the claw groove to press against the acting end of the claw groove, so that the engaging part of the claw is capable of rising out of the accommodating groove,
the limiting end of each claw groove is restricted by the elastic element from rising out of a corresponding accommodating groove, and
the engaging part of each claw swings to the first position and engages with the ratchet ring on the driving base when the driving base rotates in one direction.

* * * * *